United States Patent [19]

Marx

[11] Patent Number: 5,152,674
[45] Date of Patent: Oct. 6, 1992

[54] APPARATUS FOR PUMPING WATER FROM RISE AND FALL MOTION OF WAVES

[76] Inventor: Robert P. Marx, 7 Fairway La., Littleton, Colo. 80123

[21] Appl. No.: 764,459

[22] Filed: Sep. 24, 1991

[51] Int. Cl.⁵ .......................................... F04B 35/00
[52] U.S. Cl. .................................... 417/331; 417/554
[58] Field of Search ............... 417/330, 331, 332, 552, 417/554

[56] References Cited

U.S. PATENT DOCUMENTS

| | | | |
|---|---|---|---|
| 544,376 | 8/1895 | Porter | 417/552 |
| 1,264,554 | 4/1918 | Peron | 417/552 |
| 1,516,349 | 11/1924 | Rittenhouse | 417/554 |
| 3,030,893 | 4/1962 | Shaffer | 417/331 |
| 3,040,667 | 6/1962 | Shaffer | 417/331 |
| 3,362,336 | 1/1968 | Kafka | 417/331 |
| 3,446,156 | 5/1969 | Lightfoot | 417/554 |
| 3,487,228 | 12/1969 | Kriegel | 290/53 |
| 3,580,695 | 5/1971 | Tumba | 417/330 |
| 3,906,845 | 9/1975 | Wegmann | 417/554 |
| 4,076,463 | 2/1978 | Welczer | 417/331 |
| 4,218,192 | 8/1980 | West | 417/337 |
| 4,309,154 | 1/1982 | Daddario | 417/337 |
| 4,326,840 | 4/1982 | Hicks et al. | 417/331 |
| 4,754,157 | 6/1988 | Windle | 417/331 |

OTHER PUBLICATIONS

B. M. Count, "Exploiting Wave Power", IEEE Spectrum, Sep. 1979, pp. 42-49.
G. Hagerman & T. Heller, "Wave Energy: A Survey of Twelve Near-Term Technologies", Sep. 1988, 12 pages.

*Primary Examiner*—Richard A. Bertsch
*Assistant Examiner*—Charles G. Freay
*Attorney, Agent, or Firm*—John R. Flanagan

[57] ABSTRACT

A wave motion-actuated pumping apparatus includes a pair of inner and outer telescoping sleeves, a float, an anchoring arrangement, and a pair of one-way flow valves. The inner and outer sleeve are telescopically fitted together for reciprocal sliding movement relative to one another and define a water flow chamber therebetween being variable in volume in response to reciprocal movement of the tubular members relative to one another. The inner and outer tubular members also respectively define an inlet to and an outlet from the chamber. The float is attached about the outer sleeve so as to provide it with sufficient buoyancy to floatably follow up and down motion of waves with the float when the float and outer sleeve are disposed in a body of water. The inner sleeve is attached to the anchoring arrangement to restrain the inner sleeve from following up and down motion of waves with the outer sleeve, thereby causing the outer sleeve to reciprocally move relative to the inner sleeve. The upper and lower one-way flow valves are mounted respectively to the inner and outer sleeves across the respective inlet and outlet of the chamber in an arrangement which produces opening and closing of the valves in response to, and thereby in coordination with, reciprocal movement to the outer sleeve relative to the inner sleeve so as to cause pumping of water from the outlet of the chamber.

17 Claims, 2 Drawing Sheets

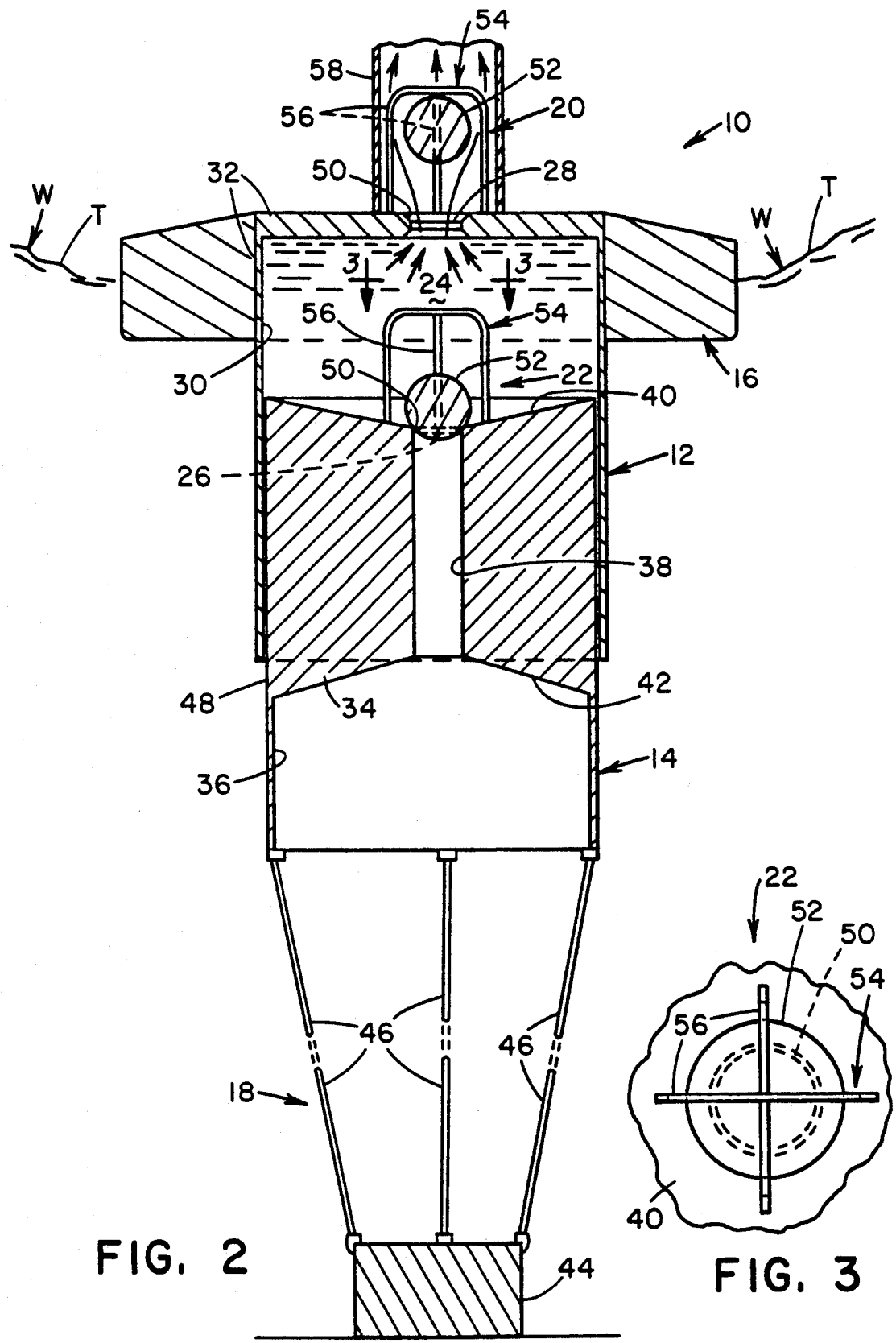

APPARATUS FOR PUMPING WATER FROM RISE AND FALL MOTION OF WAVES

BACKGROUND OF THE INVENTION

1. Field of the Invention

The present invention generally relates to pumping apparatus and, more particularly, is concerned with an apparatus for pumping water from rise and fall motion of waves.

2. Description of the Prior Art

One of the more promising renewable sources of energy is ocean waves. Many devices have been proposed in prior art patents and literature for converting the energy of waves into a mechanical motion for performing work, such as generating electricity. In an article appearing in the September 1979 issue of IEEE Spectrum magazine entitled "Exploiting Wave Power", B. M. Count states that the first recorded patent was granted in 1799 to a Frenchman, M. Girard. Count goes on to state that all wave-power inventions to date have been conceptually simple, utilizing floats, flaps, sloping ramps or other "wave traps," or stationary air-pressure chambers and similar devices. He cites the emergence of two major categories of devices: dynamically active devices and passive devices. In the active device, the structural elements move in response to the wave, with power being extracted through the relative motion of the elements. A passive arrangement captures the wave energy with a relatively large, immovable structure. Being both bulky and relatively inefficient, passive devices are the least promising among suggested wave-power conversion schemes.

In a paper given in 1988 in Honolulu, Hi., entitled "Wave Energy: A Survey of Twelve Near-Term Technologies", investigators George Hagerman and Ted Heller grouped the major technologies for wave power conversion into five categories: heaving devices, heaving and pitching devices, pitching devices, oscillating water columns, and surge devices. Heaving devices use only the vertical motion of floats on waves to stroke various types of pumps. Combined heaving and pitching devices absorb energy from two or more motions of the waves, such as heave, pitch and roll. An oscillating water column device employs wave-induced motion of an entrained column of seawater as the driving force. Surge devices make use of a wave's forward horizontal force.

U.S. Pat. No. 4,996,840 which issued on Mar. 5, 1991 to the Robert P. Marx, the inventor of the present invention, and which thus does not constitute prior art to the subject invention, discloses an apparatus for generating rotary motion from rise and fall motion of waves. In its basic components, the rotary motion generating apparatus includes (a) an outer hollow sleeve, (b) a float sealably attached across the upper end of the outer sleeve to define an interior cavity, prevent entry of water into the cavity and provide the outer sleeve with sufficient buoyancy to floatably follow up and down motion of waves, (c) an inner hollow sleeve fitted telescopically within the outer sleeve, and (d) an anchoring arrangement attached to the inner sleeve for restraining it from following up and down motion of waves with the outer sleeve and float. The outer sleeve will slidably reciprocate, or move up and down, relative to the inner sleeve as the outer sleeve and float floatably follow up and down motion of waves and correspondingly will draw a flow of water upwardly and force a flow of water downwardly through the inner sleeve. The rotary motion generating apparatus also includes a rotary motion producing mechanism mounted within the inner sleeve intersecting and engaging the flow of water through the inner sleeve. In response to flow of water in either direction, upwardly or downwardly, through the inner sleeve, the rotary motion-producing mechanism continuously produces rotary motion in a single direction.

It has been perceived by the inventor herein that the basic components of the above-described apparatus producing reciprocal upward and downward movement of the outer sleeve relative to the inner sleeve can be employed to produce additional useful work, other than just that of rotary motion.

SUMMARY OF THE INVENTION

The present invention provides an apparatus for pumping water from rise and fall motion of waves, such as in ocean tides. The pumping apparatus employs a pair of outer and inner telescoping tubular members, a float, an anchoring arrangement, and a pair of one-way flow valves. The inner and outer tubular members are telescopically fitted together for reciprocal sliding movement relative to one another. The tubular members define a water flow chamber therebetween being variable in volume in response to reciprocal movement of the tubular members relative to one another. The tubular members also respectively define an inlet to and an outlet from the chamber. The float is attached about the outer tubular member so as to provide the outer tubular member with sufficient buoyancy to floatably follow up and down motion of waves with the float when the float and outer tubular member are disposed in a body of water. The anchoring arrangement is attached to the inner tubular member for restraining the inner tubular member from following up and down motion of waves with the outer tubular member so as to cause the outer tubular member to reciprocally move relative to the inner tubular member as the outer tubular member and float floatably follow up and down motion of waves. The upper and lower one-way flow valves are mounted respectively to the inner and outer tubular members across the respective inlet to and outlet from the chamber in an arrangement which produces opening and closing of the one-way valves in response to, and thereby in coordination with, reciprocal movement of the outer tubular member relative to the inner tubular member, as produced by rise and fall motion of waves, so as to cause flow of water into the chamber through the inlet of the chamber and pumping of water from the chamber through the outlet of the chamber.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 2 is a view similar to that of FIG. 1 but showing the pumping apparatus encountering a descending trough of a wave.

FIG. 3 is an enlarged top plan view as seen along line 3—3 of FIG. 2, illustrating a cage of one of a pair of one-way flow valves employed by the pumping apparatus of the present invention.

DETAILED DESCRIPTION OF THE INVENTION

Figure 1:
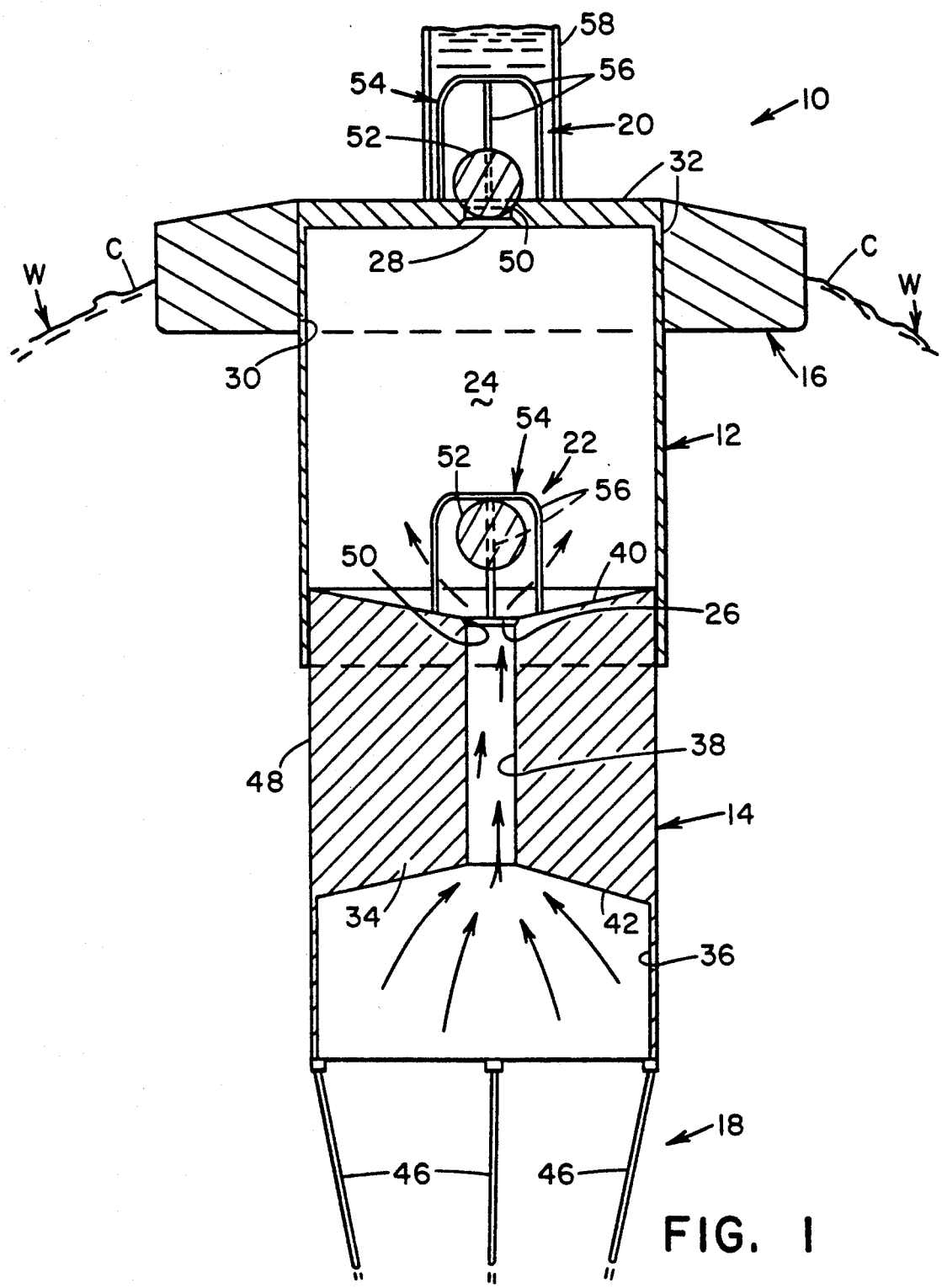
FIG. 1 is an axial sectional view of a wave motion-driven pumping apparatus of the present invention showing the pumping apparatus encountering an ascending crest of a wave.

Referring to the drawings, and particularly to FIGS. 1 and 2, there is shown a wave motion-driven pumping apparatus, generally designated 10, constructed in accordance with the principles of the present invention. In its basic components, the pumping apparatus 10 includes a pair of outer and inner tubular members 12 and 14, a float 16 mounted about the outer tubular member 12, an anchoring arrangement 18, and a pair of upper and lower one-way flow valves 20, 22 mounted respectively to the outer and inner tubular members 12, 14.

Preferably, the tubular members 12 and 14 of the pumping apparatus 10 are in the form of outer and inner cylinders or sleeves. The interior diameter of the outer sleeve 12 is slightly greater than the external diameter of the inner sleeve 14, thereby permitting the outer and inner sleeves 12, 14 to be telescopically interfitted together for reciprocal sliding movement relative to one another. The outer and inner sleeves 12, 14 define a water flow chamber 24 therebetween which is variable in volume in response to reciprocal movement of the sleeves 12, 14 relative to one another. The outer and inner sleeves 12, 14 also respectively define an inlet 26 to and an outlet 28 from the water flow chamber 24.

The float 16 of the pumping apparatus 10 is in the form of an annular body having a central bore 30 and being of larger diameter than the outside diameter of the outer sleeve 12. At an upper portion 32, the outer sleeve 12 is received in the central bore 30 and secured to the float body 16. The float body 16 can be hollow and filled with air, or can be solid and composed of a material less dense than water. In either case, the float body 16 and outer sleeve 12 are sufficiently lightweight compared to the volume of water displaced by them so as to provide the float body 16 and outer sleeve 12 with sufficient buoyancy to floatably follow up and down motion of waves in a body of water.

The inner sleeve 14 of the pumping apparatus 10 has an interior annular body portion 34 attached to an interior cylindrical surface 36 of the inner sleeve 14 and extending between opposite ends thereof. The interior annular body portion 34 defines a central passage 38 through the inner sleeve 14. Also, the interior annular body portion 34 has upper and lower annular surfaces 40, 42 of reverse conical shapes converging toward one another to the central passage 38 which function to funnel the flow of water toward the passage 38. The interior annular body portion 34 can be solid and composed of a material less dense than water, or can be hollow forming a sealed annular cavity filled with air. In either case, the annular body portion 34 defines a flotation cell which provides a certain amount of buoyancy to the inner sleeve 14.

In order to ensure relative motion between the outer and inner sleeve 12 and 14 in response to the rise and fall motion of the waves W, the inner sleeve 14 is held generally stationary in the body of water with respect to the vertical direction. To achieve this, the pumping apparatus 10 employs the mooring or anchoring arrangement 18 which is attached to the inner sleeve 14 to restrain the inner sleeve 14 from following up and down motion of the outer sleeve 12 and float 16 as caused by the corresponding motion of the waves. In one exemplary form, the anchoring arrangement 18 is a platform or anchor 44 resting stationarily within the body of water, and a tether or rod 46 interconnecting the anchor 44 and the lower end of the inner sleeve 14. The inner sleeve 14 is permitted by the anchoring arrangement 18 to sway from side-to-side horizontally to accommodate the driving force of a passing wave while, at the same time, is restrained by the arrangement 18 from moving upward with the motion of the passing wave.

With the inner sleeve 14 so restrained, the outer sleeve 12 will slidably reciprocate, or move up and down, relative to the inner sleeve 14 as the outer sleeve 12 and float 16 floatably follow and are carried up and down between crest and trough elevations of the wave by the motion of the wave. In other words, the outer sleeve 12 will slide in a reciprocatory manner along the exterior cylindrical surface 48 of the inner sleeve 14 while, at the same time, the inner sleeve 14 is restrained from undergoing upward movement by the anchoring arrangement 18 and from undergoing downward movement by its own inherent buoyancy.

In order to achieve a water pumping action by the pumping apparatus 10, as shown in FIGS. 1 and 2, the upper and lower one-way flow valves 20 and 22 of the pumping apparatus 10 are mounted respectively to the outer and inner sleeves 12 and 14 respective across the inlet 26 and outlet 28 of the chamber 24 defined by the telescoped sleeves. Preferably, the upper and lower one-way flow valves 20, 22 are ball-type valves, although other types of valves can be used. Each of the one-way flow valves 20, 22 includes an annular valve seat 50 surrounding the respective inlet 26 and outlet 28 of the chamber 24, closure means in the form of a spherical ball 52 capable of seating on and unseating from the annular valve seat 50 to correspondingly place the valve 20, 22 in closed and opened conditions, and means in the form of a cage 54 for retaining the unseated ball 52 near the valve seat 50 when the valve 20, 22 is in the opened condition.

The spherical ball 52 can be composed of any suitable solid material, or can be hollow and filled with any suitable liquid, such as water. In either case, the ball 52 must be heavier than the volume of water that it displaces so that the natural tendency of the ball is to settle back down on the valve seat 50 whenever the upward flow of water is not sufficient to lift the ball off the seat. When the ball 52 rests on the valve seat 50, the respective one-way flow valve 20, 22 assumes the closed condition in which the flow of water through the inlet 26 or outlet 28 is prevented.

Referring to FIGS. 1-3, as an example, the cages 54 are composed of strands of stiff rod 56 criss-crossing one another and deformed into inverted U-shapes and attached at their ends to the portion of the respective one of the outer and inner sleeves 12, 14 surrounding the valve seat 50. This construction permits water to flow through the cage 54 while the cage 54 encompasses the ball 52 and thereby limits the distance through which the ball 52 can be displaced from the valve seat 50.

The upper and lower one-way valves 20, 22 are provided in an arrangement with the inlet 26 and outlet 28 of the water flow chamber 24 which produces alternating opening and closing of the one-way flow valves 20, 22 in response to, and thereby in coordination with, reciprocal movement of the outer sleeve 12 relative to the inner sleeve 14. In such manner, the flow of water into the chamber 24 through the inlet 26 of the chamber 24 and the pumping of water from the chamber 24 through the outlet 28 of the chamber 24 are achieved in alternate relation to one another. The upper one-way flow valve 20 which extends across the outlet 28 of the chamber 24 is also disposed in an exterior flexible conduit 58 which communicates with the outlet 28. The water pumped from the chamber 24 by the pumping apparatus 10 is routed by the exterior conduit 58 to any desired location.

The pumping apparatus 10 operates as follows. Upon encountering the ascending crest C of a wave W as depicted in FIG. 1, the outer sleeve 12 and float 16 are carried upwardly by the wave and thus move upwardly relative to the stationary inner sleeve 14 to the position shown in FIG. 1, expanding the volume of the interior chamber 24 of the pumping apparatus 10. During such upward movement of the outer sleeve 12, the upper one-way flow valve 20 is maintained in the closed condition due to the back pressure of the existent water head in the flexible conduit 58 connected in communication with the upper flow valve 20. With the upper one-way flow valve 20 in the closed condition, expansion of the volume of the chamber 24 creates a partial vacuum condition within the chamber 24 which draws or sucks a flow of water upwardly through the central passage 38 of the body portion 34 of the inner sleeve 14. The creation of the partial vacuum condition causes the lower one-way flow valve 22 to assume the opened condition, creating a flow of water into the chamber 24.

On the other hand, upon encountering the descending trough T of a wave W as depicted in FIG. 2, the outer sleeve 12 and float 16 are carried downwardly by gravity and thus move downwardly relative to the stationary inner sleeve 14 from the position of FIG. 1 to that of FIG. 2, contracting the volume of the interior chamber 24 of the pumping apparatus 10. During such downward movement of the outer sleeve 12, the lower one-way flow valve 22 is maintained in the closed condition due to the back pressure of the existent water head in the chamber 24 communicating with the lower flow valve 22. This forces a flow of water upwardly which causes the upper one-way flow valve 20 to assume the opened condition so that water is pumped from the chamber 24 and through the upper conduit 58.

In summary, passing crests C and troughs T of waves W make the float 16 rise and fall (go up and down) with the waves which, in turn, causes the outer sleeve 12 to slidably move vertically and cyclically up and down relative to the more or less stationarily-held inner sleeve 14. The up and down reciprocal movement of the outer sleeve 12 alternately draws water upwardly into the chamber 24, via the passage 38 of the inner sleeve 14 and the inlet 26 opened by the lower one-way flow valve 22, by creation of suction forces in the chamber 24, and forces the water upwardly from the chamber 24, via the outlet 28 opened by the upper one-way flow valve 20, into the upper conduit 58 through which the water flows to a desired destination, such as a reservoir (not shown).

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

Having thus described the invention, what is claimed is:

1. An apparatus for pumping water from the rise and fall motion of waves, comprising:
   (a) a pair of inner and outer tubular members being telescopically fitted together for reciprocal sliding movement relative to one another and defining a water flow chamber therebetween being variable in volume in response to reciprocal movement of said tubular members relative to one another, said inner and outer tubular members also respectively defining an inlet to and an outlet from said chamber, said inner tubular member including an interior annular body portion forming a central passage through said inner tubular member leading to said inlet to said chamber, said annular body portion of said inner tubular member defining a flotation cell providing buoyancy to said inner tubular member;
   (b) a float attached about said outer tubular member so as to provide said outer tubular member with sufficient buoyancy to floatably follow the up and down motion of waves with said float when said float and outer tubular member are disposed in a body of water;
   (c) means attached to said inner tubular member for restraining said inner tubular member from following the up and down motion of waves with said outer tubular member so as to cause said outer tubular member to reciprocally move relative to said inner tubular member as said outer tubular member and float floatably follow the up and down motion of waves; and
   (d) a pair of upper and lower one-way flow valves mounted respectively to said inner and outer tubular members across said respective inlet and outlet of said chamber in an arrangement which produces opening and closing of said valves in response to, and thereby in coordination with, reciprocal movement of said outer tubular member relative to said inner tubular member, as produced by the rise and fall motion of waves, so as to cause flow of water into said chamber through said inlet thereof and pumping of water from said chamber through said outlet thereof.

2. The apparatus of claim 1 wherein said outer and inner tubular members are outer and inner cylindrical sleeves.

3. The apparatus of claim 3 wherein said annular body portion has upper and lower annular surfaces of conical shapes converging toward one another to said passage for funneling the flow of water to said passage.

4. The apparatus of claim 1 wherein said restraining means is an anchoring arrangement which includes:
   an anchor for resting stationarily within the body of water; and
   means interconnecting said anchor and said second tubular member for permitting said inner tubular member to sway horizontally to accommodate the driving force of a passing wave while restraining said inner tubular member from moving up with the motion of the passing wave.

5. The apparatus of claim 1 wherein each of said upper and lower one-way flow valves includes:
   an annular valve seat surrounding said respective inlet and outlet of said chamber; and closure means capable of seating on and unseating from on said annular valve seat to correspondingly place said valve in closed and opened conditions.

6. The apparatus of claim 5 wherein said closure means is a spherical ball being heavier than the volume of water displaced by said ball.

7. The apparatus of claim 5 wherein each of said upper and lower one-way flow valves also includes means for retaining said closure means near said valve seat when said valve is in said opened condition.

8. The apparatus of claim 7 wherein said closure means is a spherical ball being heavier than the volume of water displaced by said ball.

9. The apparatus of claim 8 wherein said retaining means is a cage formed by strands of stiff rods crisscrossing one another and deformed into inverted U-shapes and attached at their ends to the portion of said respective one of said outer and inner members surrounding said valve seat so as to permit water to flow through said cage while said cage encompasses said ball and thereby limits the distance through which said ball can be displaced from said valve seat.

10. An apparatus for pumping water from the rise and fall motion of waves, comprising:
    (a) a pair of inner and outer hollow sleeves being telescopically fitted together for reciprocal sliding movement relative to one another and defining a water flow chamber therebetween being variable in volume in response to reciprocal movement of said sleeves relative to one another, said inner and outer sleeves also respectively defining an inlet to and an outlet from said chamber, said inner sleeve including an interior annular body portion forming a central passage through said inner sleeve leading to said inlet to said chamber, said annular body potion of said inner sleeve defining a flotation cell providing buoyancy to said inner sleeve;
    (b) a float attached about said outer sleeve so as to provide said outer sleeve with sufficient buoyancy to floatably follow the up and down motion of waves with said float when said float and outer sleeve are disposed in a body of water;
    (c) an anchoring arrangement attached to said inner sleeve for restraining said inner sleeve from following the up and down motion of waves with said outer sleeve so as to cause said outer sleeve to reciprocally move relative to said inner sleeve as said outer sleeve and float floatably follow the up and down motion of waves; and
    (d) a pair of upper and lower one-way flow valves mounted respectively to said inner and outer sleeves across said respective inlet and outlet of said chamber in an arrangement which produces, in alternating fashion, opening and closing of said valves in response to, and thereby in coordination with, reciprocal movement of said outer sleeve relative to said inner sleeve, as produced by the rise and fall motion of waves, so as to cause flow of water into said chamber through said inlet thereof and pumping of water from said chamber through said outlet thereof.

11. The apparatus of claim 10 wherein said annular body portion of said inner sleeve has upper and lower annular surfaces of conical shapes converging toward one another to said passage for funneling the flow of water to said passage.

12. The apparatus of claim 10 wherein said anchoring arrangement includes:
    an anchor for resting stationarily within the body of water; and
    means interconnecting said anchor and said inner sleeve for permitting said inner sleeve to sway horizontally to accommodate the driving force of a passing wave while restraining said inner sleeve from moving up with the motion of the passing wave.

13. The apparatus of claim 10 wherein each of said upper and lower one-way flow valves includes:
    an annular valve seat surrounding said respective inlet and outlet of said chamber; and
    closure means capable of seating on and unseating from on said annular valve seat to correspondingly place said valve in closed and opened conditions.

14. The apparatus of claim 13 wherein said closure means is a spherical ball being heavier than the volume of water displaced by said ball.

15. The apparatus of claim 13 wherein each of said upper and lower one-way flow valves also includes means for retaining said closure means near said valve seat when said valve is in said opened condition.

16. The apparatus of claim 15 wherein said closure means is a spherical ball being heavier than the volume of water displaced by said ball.

17. The apparatus of claim 16 wherein said retaining means is a cage formed by strands of stiff rods crisscrossing one another and deformed into inverted U-shapes and attached at their ends to the portion of said respective one of said outer and inner sleeves surrounding said valve seat so as to permit water to flow through said cage while said cage encompasses said ball and thereby limits the distance through which said ball can be displaced from said valve seat.

* * * * *